N. C. CROSS.
PLANTER.
APPLICATION FILED MAR. 30, 1912.
1,073,742.
Patented Sept. 23, 1913.
2 SHEETS—SHEET 1.
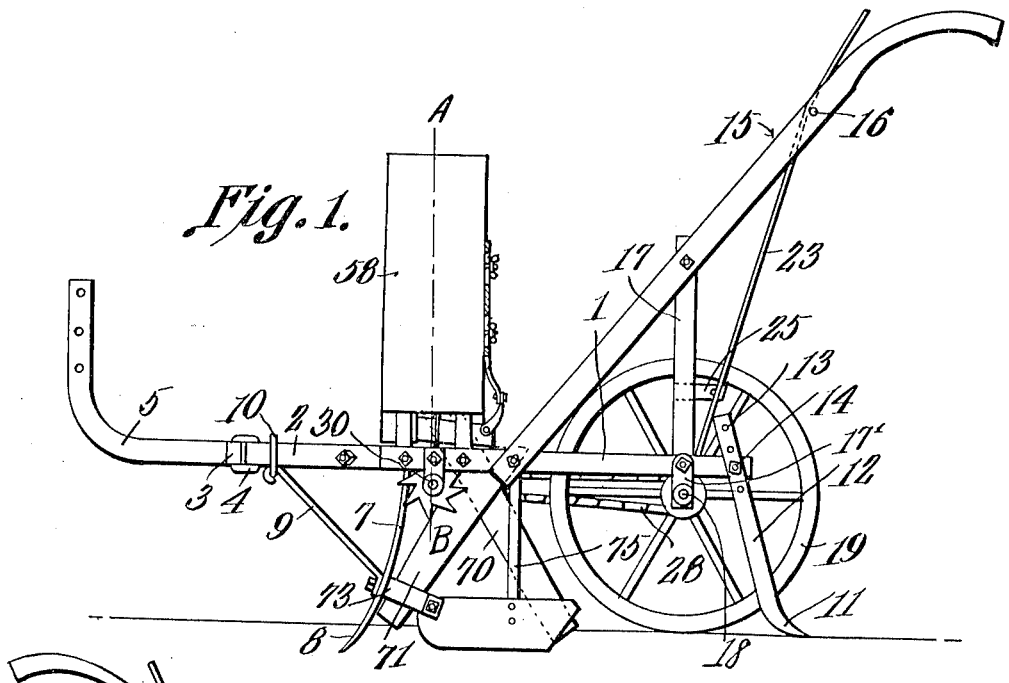
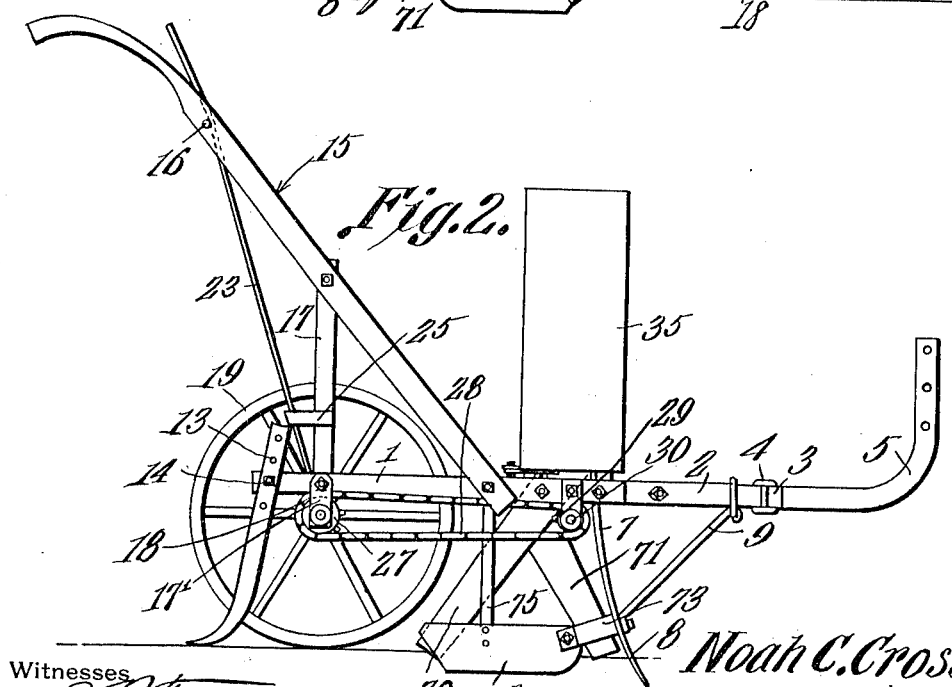
Noah C. Cross, Inventor

N. C. CROSS.
PLANTER.
APPLICATION FILED MAR. 30, 1912.

1,073,742.

Patented Sept. 23, 1913.

2 SHEETS—SHEET 2.

Witnesses

Noah C. Cross,
Inventor by C. A. Snow & Co.,
Attorneys

UNITED STATES PATENT OFFICE.

NOAH C. CROSS, OF BUFORD, GEORGIA.

PLANTER.

1,073,742.  Specification of Letters Patent. Patented Sept. 23, 1913.

Application filed March 30, 1912. Serial No. 687,378.

*To all whom it may concern:*

Be it known that I, NOAH C. CROSS, a citizen of the United States, residing at Buford, in the county of Gwinnett and State of Georgia, have invented a new and useful Planter, of which the following is a specification.

This invention relates to planters particularly designed for planting corn and cotton seeds, one of the objects of the invention being to combine mechanisms whereby fertilizer can be deposited in the furrow simultaneously with the seeds but at a point in advance thereof and directly back of the furrow opener so that the loose soil dropping back into the furrow will cover the fertilizer and thus prevent the seeds from coming directly into contact with the fertilizer.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

Figure 3:
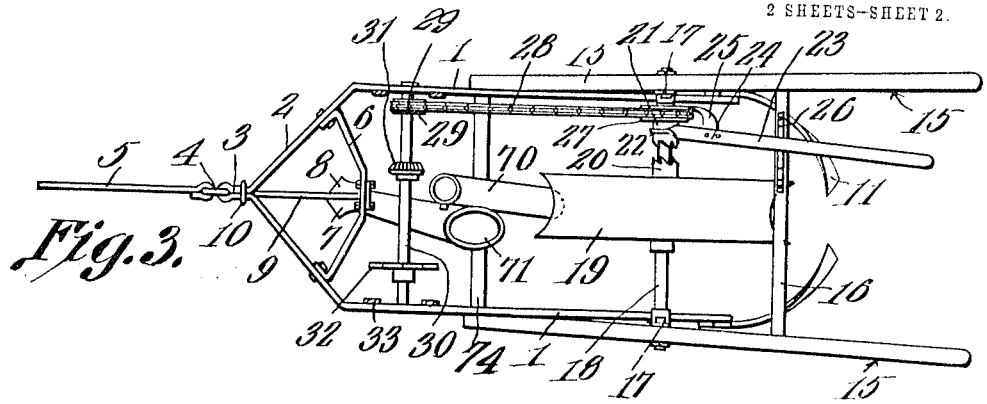
Figure 4:
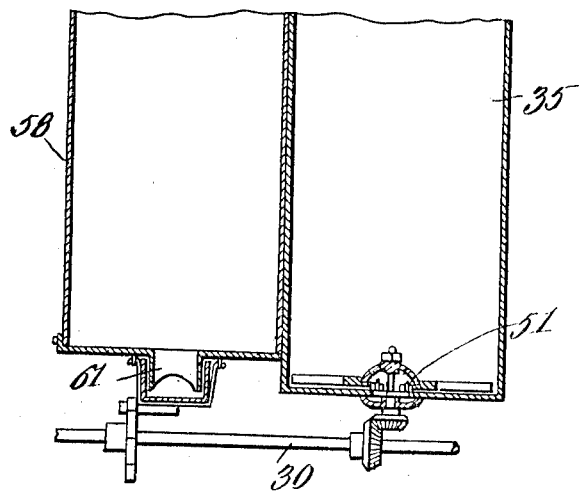

In said drawings:—Figure 1 is a side elevation of the machine. Fig. 2 is an elevation showing the side of the machine opposite to that shown in Fig. 1. Fig. 3 is a plan view, the seed and fertilizer boxes being removed. Fig. 4 is an enlarged vertical transverse section through the lower portion of the boxes and through the mechanism combined therewith, said sections being taken on line A—B Fig. 1 and the tappet wheel being shown in elevation.

Referring to the figures by characters of reference 1 designates side frame members the front ends of which converge forwardly as at 2 and form a loop 3 connected, as by means of a link 4, to a standard 5 which is upturned, as shown, and is adapted to be connected to suitable draft appliances. A cross brace 6 is secured between the converging portions 2 of the side members and secured to the center of this brace is the upper end portion of a standard 7 having a furrow opening plow or shovel 8 at its lower end. A brace 9 extends from the lower portion of the standard 7 and upwardly to a ring 10 which extends around the front end portions of the members 2 and close to the loop 3. Covering shovels 11 are arranged at the rear ends of the side members 1, the standards 12 of these shovels being formed with openings 13 any one of which is adapted to receive a fastening bolt 14 or the like which extends through the side member 1. Thus it will be seen that the covering shovels can be raised or lowered relative to the frame.

Handles 15 extend upwardly and rearwardly from the side members 1 and are connected by a cross bar 16. Braces 17 extend downwardly from the handles and are bolted or otherwise secured to the side members 1 close to the rear ends of said members. Below the braces 17 are located bearings 17' for an axle 18. A ground wheel 19 is loosely mounted on the middle portion of this axle and the tread of this wheel is preferably concaved transversely, as shown particularly in Fig. 3. The hub of the ground wheel 19 has a clutch face 20 and a sleeve 21 constituting a clutch member is feathered on the axle 18 and is engaged by the forked end 22 of a shifting lever 23. This lever is fulcrumed, as at 24, upon a bracket 25 secured upon and extending from the brace 17 at one side of the machine. A notched block 26 is fastened on the cross bar 16 and lever 23 is adapted to be shifted so as to be seated in either of the notches formed in this block. Thus it will be seen that the lever can be secured with the clutch sleeve 21 either in or out of engagement with the clutch face of hub 20.

A sprocket 27 is secured to and rotates with the clutch sleeve 21 and is adapted to transmit motion, through a chain 28, to a sprocket 29 secured to a shaft 30 which is journaled within the front portions of the side members 1 and extends transversely of the machine. Shaft 30 is provided with any suitable means for actuating dropping mechanisms 61 and 51 located at the bottoms of fertilizer and seed boxes 38 and 55 respectively supported by the frame.

An outlet spout or boot 70 is supported under the outlet of the seed box 35 and extends downwardly and rearwardly so as to deposit seeds in the furrow at a point in advance of but close to the ground wheel 19. The upper end of the spout can be attached to the seed box in any suitable manner. Another outlet spout or boot 71 extends downwardly below the fertilizer box and is adapted to receive fertilizer discharged by the mechanism 61. This boot 71 extends downwardly and forwardly so as to discharge fertilizer back of and close to the furrow opener 8. A shoe 72 is connected to the back face of the furrow opener 8 by a bracket 73 through which the lower end of the spout or boot 71 projects and this shoe may be connected to the cross strip 74 by means of upwardly extending braces 75. Said cross strip is arranged between and secured to the side members 1.

When the machine is moved forward the wheel 19 will, under ordinary conditions, rotate freely on the axle 18. When, however, it is desired to deposit fertilizer and seeds in the furrow opened by the plow 8, sleeve 21 is shifted into engagement with hub 20 by means of lever 23. The wheel 19 will thus rotate the sleeve 21 and cause motion to be transmitted through chain 28 and its sprockets to shaft 30 which will operate the dropping mechanisms so that seeds will fall into the boot or spout 70 and fertilizer will drop into the boot or spout 71. The fertilizer will thus be directed into the furrow directly back of the plow 8 and the loose soil at the sides of the furrow will fall back onto the fertilizer, thus to prevent the seeds from being deposited directly on the fertilizer. The shoe 72 operates to make the furrow of uniform depth and, after the seeds and fertilizer have been deposited in the furrow, the covering shovels 11 turn the soil into the furrow, thus completing the planting operation.

What is claimed is:—

1. In a planter the combination with a furrow opener, a bracket extending rearwardly therefrom, and a shoe connected to the bracket and spaced therefrom from the furrow opener, of separate receptacles arranged side by side for holding seeds and fertilizer respectively, a boot extending downwardly from the fertilizer receptacle and through the bracket for discharging fertilizer back of the furrow opener and in front of the shoe, and a second boot extending downwardly from the seed receptacle for discharging seeds into the furrow at a point in back of the shoe.

2. The combination with a wheel supported structure and a furrow opener carried by the structure and in front of the supporting wheel, of a seed box and fertilizer box arranged side by side upon the structure, a transversely extending shaft located under the seed box, means carried by said shaft for controlling the discharge of seeds and fertilizer from the respective boxes, means operated by the supporting wheel for rotating said transverse shaft, a bracket arranged upon the back of the furrow opener, a shoe connected to the bracket, a boot extending downwardly from the fertilizer box and secured at its lower end portion within the bracket so as to discharge fertilizer into the furrow close to the furrow opener and in front of the shoe, and a boot extending downwardly and rearwardly from the seed box and disposed, at its lower end, between the back ends of the side portions of the shoe for directing seeds into the furrow back of the shoe, the lower ends of the two boots being disposed along the longitudinal center of the planter and in the path of the supporting wheel, said wheel constituting a coverer.

In testimony that I claim the foregoing as my own, I have hereunto affixed my signature in the presence of two witnesses.

NOAH C. CROSS.

Witnesses:
E. A. WILBANKS,
R. H. GORDY.

Copies of this patent may be obtained for five cents each, by addressing the "Commissioner of Patents Washington, D. C."